United States Patent [19]

Oke et al.

[11] Patent Number: 5,469,075
[45] Date of Patent: Nov. 21, 1995

[54] TESTABLE EMBEDDED MICROPROCESSOR AND METHOD OF TESTING SAME

[75] Inventors: Timothy P. Oke; Russell E. Cummings, II, both of Milpitas; Nachum M. Gavrielov, Palo Alto, all of Calif.

[73] Assignee: LSI Logic Corporation, Milpitas, Calif.

[21] Appl. No.: 346,581

[22] Filed: Nov. 29, 1994

Related U.S. Application Data

[63] Continuation of Ser. No. 132,747, Oct. 6, 1993, abandoned, which is a continuation of Ser. No. 628,202, Dec. 13, 1990, Pat. No. 5,254,940.

[51] Int. Cl.[6] .................... G01R 31/28; G01R 31/318
[52] U.S. Cl. ............................ 324/763; 371/22.5
[58] Field of Search ...................... 324/763, 765, 324/768, 769, 158.1; 371/21.1, 22.1, 22.3, 22.5, 22.6

[56] References Cited

U.S. PATENT DOCUMENTS

| | | | |
|---|---|---|---|
| 3,961,251 | 6/1976 | Hurley et al. | 371/21.1 |
| 3,961,252 | 6/1976 | Eichelberger | 371/22.3 |
| 3,961,254 | 6/1976 | Cavaliere et al. | 371/22.3 |
| 4,357,703 | 11/1982 | Van Brunt | 371/22.5 |
| 4,698,588 | 10/1987 | Hwang et al. | 324/158 R |
| 4,743,841 | 5/1988 | Takeuchi | 324/158 R |
| 4,931,722 | 6/1990 | Stoica | 324/158 R |
| 4,970,454 | 11/1990 | Stambaugh et al. | 324/158 T |
| 5,331,643 | 7/1994 | Smith | 371/22.1 |

FOREIGN PATENT DOCUMENTS 0110160  9/1981  Japan ................ 371/29.5

*Primary Examiner*—Ernest F. Karlsen
*Attorney, Agent, or Firm*—Poms, Smith, Lande & Rose

[57] ABSTRACT

A technique of gaining direct access to the inputs and outputs of an embedded microprocessor, otherwise buried behind additional logic, is disclosed. Multiplexers are provided for at least the embedded microprocessor inputs and outputs. In a test mode, the multiplexers connect device input and output pads directly to the embedded microprocessor inputs and outputs. In a normal operating mode, the multiplexers connect the additional logic to the input and output pads. Preferably, in order to standardize design criteria, multiplexers are provided on all of the inputs and outputs of the microprocessor which may become embedded behind additional logic. Additionally, it is possible in the test mode to control the additional logic to a well defined state. The invention provides a simple way to isolate the embedded microprocessor from the rest of the logic and test it thoroughly using test vectors that have already been developed for the stand-alone microprocessor.

5 Claims, 1 Drawing Sheet

TESTABLE EMBEDDED MICROPROCESSOR AND METHOD OF TESTING SAME

This application is a continuation of now abandoned application, Ser. No. 08/132,747, filed Oct. 6, 1993, which is a continuation of Ser. No. 07/628,202 filed Dec. 13, 1990, now U.S. Pat. No. 5,254,940.

TECHNICAL FIELD OF THE INVENTION

The invention relates to Application Specific Integrated Circuits (ASICs), particularly those with embedded macrofunctional units, such as microprocessors, surrounded by user-specific logic.

BACKGROUND OF THE INVENTION

As ASIC technology progresses, it is becoming possible to embed large, standard macrofunctional units within an ASIC chip, surrounded by user-specific logic. An appropriate example of such an embedded macrofunctional unit is a microprocessor.

A standard microprocessor usually has a set of test vectors that can be used to test it in a stand alone mode. The test vectors are generally applied to the microprocessor inputs, and the microprocessor outputs are monitored for predicted response. However, as the microprocessor becomes embedded within additional customer-specific logic, the inputs and outputs (I/O) become "buried", and the test parameters become less and less valid, significantly complicating or preventing the use of stand-alone test vectors. While new test regimens (sets of test vectors) can be generated which account for the influence of the additional user or application specific logic surrounding the embedded microprocessor, such an approach would require a new or modified test regimen for each instance of an embedded microprocessor, on a case-by-case basis. This would result in additional development costs for the chip.

What is needed is a technique for isolating the microprocessor, so that standard test regimens can be applied to it, irrespective of surrounding logic.

DISCLOSURE OF THE INVENTION

It is therefore an object of the present invention to provide a technique for isolating an embedded macrofunction, such as a microprocessor, so that it can be tested using a "standard" set of test vectors. (The "standard" set of test vectors are those generated for a stand-alone microprocessor.)

According to the invention, a standard macrofunction, such as a microprocessor is embedded in a silicon chip, such as an ASIC, with additional (non-standard) user or application specific logic surrounding the microprocessor on the chip.

Hereinafter, embedded microprocessors are discussed, and the term "additional logic" refers to any user or application specific logic surrounding the microprocessor on the chip.

Isolation devices, such as multiplexers (MUXs) are provided on at least the embedded Inputs and Outputs (I/O) of the microprocessor, in other words on any I/O line that does not have a physical pin out for external interfacing. Preferably, in order to standardize design criteria, multiplexers are provided on all of the inputs and outputs of the microprocessor.

A control signal activates and deactivates the muxes, depending on whether the device is in the isolation test mode or not.

Additionally, it is possible in the test mode to control the additional logic to a well defined state. One way of doing this is by halting the clock to the additional logic and forcing all of its outputs to a known value.

An advantage of the invention is that it provides a simple way to isolate the embedded microprocessor from the rest of the logic and test it thoroughly using test vectors that have already been developed for the stand-alone unit (microprocessor).

Other objects, features and advantages of the present invention will become evident in light of the following description thereof.

DETAILED DESCRIPTION OF THE INVENTION

Figure 1:
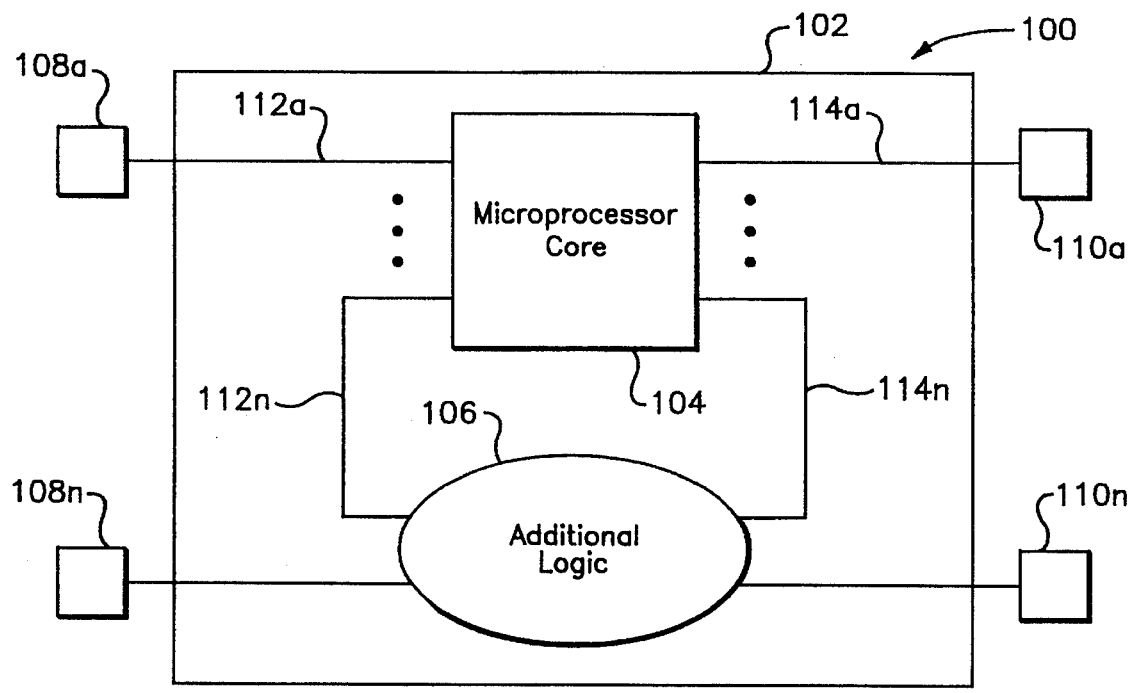
FIG. 1 is a block diagram of an integrated circuit chip having an embedded microprocessor and additional logic surrounding the microprocessor, illustrating the difficulties of testing an embedded microprocessor.

FIG. 1 shows an exemplar ASIC chip 100, which includes a silicon die 102, upon which is created a microprocessor 104 and additional (customer or application specific) logic 106. A plurality of input pads 108a–108n and a plurality of output pads 110a–110n are connected to the microprocessor 104 and additional logic 106, and comprise the interface for the device 102 to external systems (not shown). The I/O pads 108, 110 may be formed on the chip itself.

In this example, the circuit 104 is a microprocessor, such as a DMY7500A microprocessor, which is available from LSI Logic Corporation, Milpitas, CA, as a standard design element for chip designers. The microprocessor 104 has a plurality of inputs 112a–112n and a plurality of outputs 114a–114n, and a well defined, "standard" set of test vectors for testing the microprocessor 104 in a stand-alone mode.

In many user or application specific designs, the chip designer will provide additional logic 106 on the chip 100. As is illustrated in FIG. 1, the additional logic 106 will inevitably eliminate access via the input and output pads to at least a portion of the inputs and outputs of the microprocessor 104. In this example, input 112n to the microprocessor 104, which would otherwise (without additional logic 106) have a pin out (e.g., 108n) is embedded, or "buried behind the additional logic 106 which usurps the pin out 108n. Similarly, output 114n from the microprocessor 104, which would otherwise (without additional logic 106) have a pin out (e.g., 110n) is embedded, or "buried behind the additional logic 106 which usurps the pin out 110n. Hence, standard test vectors developed for exercising the microprocessor 104 lose validity, requiring the generation of a new set of test vectors for each chip containing different additional logic.

Figure 2:
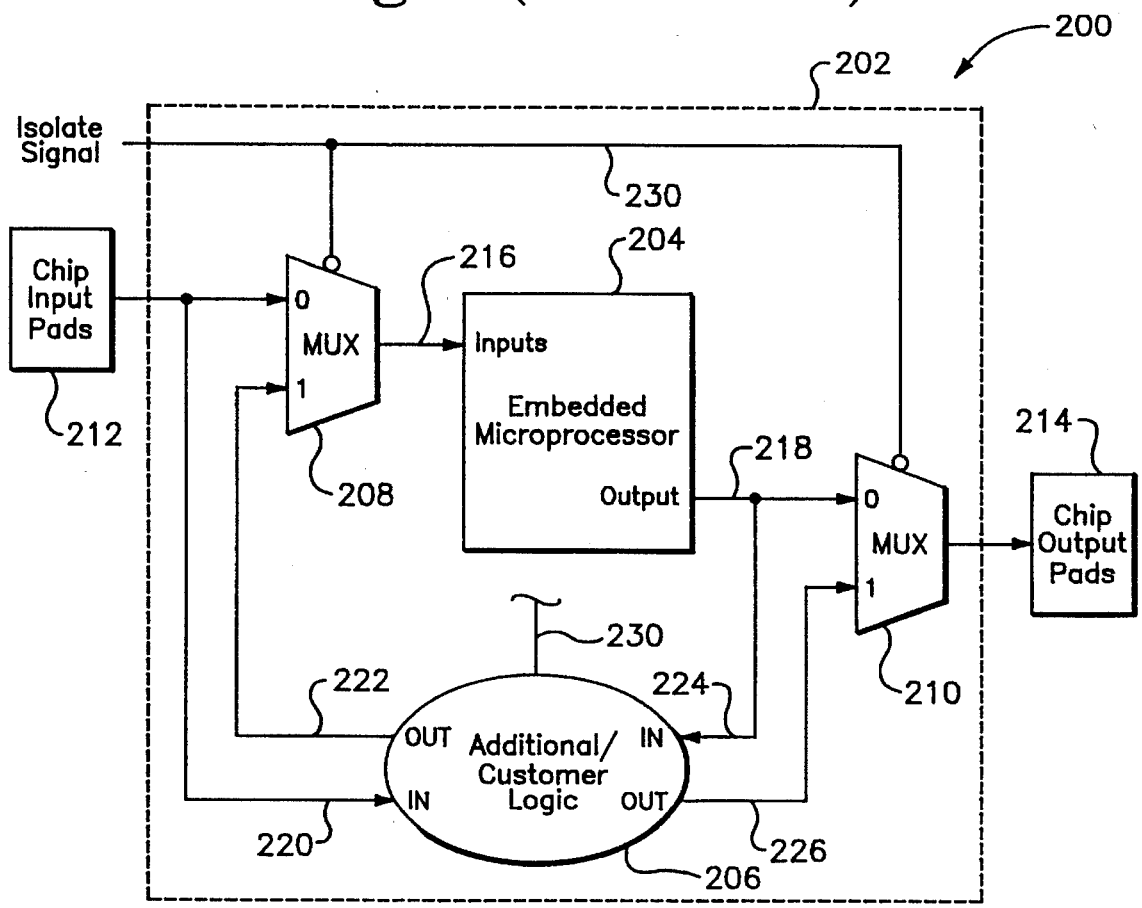
FIG. 2 is a block diagram of an integrated circuit chip having an embedded microprocessor and additional logic surrounding the microprocessor, illustrating the isolation technique of the present invention.

FIG. 2 shows an exemplary ASIC chip 200, which includes a silicon die 202, upon which is created a microprocessor 204, additional (customer or application specific) logic 206 and isolation (switching) devices such as multiplexers 208 and 210. A plurality of input pads 212 and a plurality of output pads 214 provide the interface for the chip 202 to external systems (not shown).

In this example, all of the input signals provided through the input pads 212 are provided through a representative input 220 and output 222 of the additional logic 206 to inputs 216 of the microprocessor 204, and all of the microprocessor outputs 218 are provided through a representative input 224 and output 226 of the additional logic 206 to the output pads 214. This illustrates an extreme case wherein all of the microprocessor inputs 216 and outputs 218 are embedded behind the additional logic 206. In practice, it is more likely that some of the microprocessor inputs and outputs would still connect directly to respective input and output pads, depending on the level of complexity of the chip design.

For each of those microprocessor inputs and outputs that are otherwise not directly connected to respective chip input and output pads (in this example all of the microprocessor inputs and outputs) a corresponding multiplexer 208 (for inputs 216) or 210 (for outputs 218) is provided. Each multiplexer operates in one of two states. In a normal operating mode, the multiplexer provides the respective input or output signal to/from the respective input or output pad to the respective input or output of the additional logic. In a test mode, the multiplexer provides the respective input or output signal to/from the respective input or output pad to the respective input or output of the microprocessor.

The multiplexers 208 and 210 act in unison, under the control of a signal (Isolate Signal) impressed on a common line 230.

Although not specifically shown, it is possible in the test mode to control the additional logic with the signal 230 to a well defined state. One way of doing this is by halting the clock (not shown) to the additional logic and forcing all of its outputs to a known value. One skilled in the art to which this invention most nearly pertains will readily understand the implementation of this embellishment.

Appended hereto as part of the disclosure is a document entitled "DMY7500A Hardmacro, MIL-STD-1750A Microprocessor Data Sheet" which provides further particulars for implementing the invention.

What is claimed is:

1. An integrated circuit comprising:

a die having an input pad and an output pad;

a microprocessor disposed on said die and having an input and an output;

additional logic disposed on said die and having a first output, a second output, a first input that is connected to said input pad and a second input that is connected to said output of said microprocessor;

an input multiplexer for selectively connecting said input pad or said first output of said additional logic to said input of said microprocessor;

an output multiplexer for selectively connecting said output of said microprocessor or said second output of said additional logic to the output pad; and means for forcing said additional logic to a predefined state; in which said input multiplexer and said output multiplexer have control inputs that are responsive to a control signal having a normal state or a test state;

when said control signal has said normal state, said input multiplexer is controlled to connect said first output of said additional logic to said input of said microprocessor, and said output multiplexer is controlled to connect said second output of said additional logic to said output pad;

when said control signal has said test state, said input multiplexer is controlled to connect said input pad to said input of said microprocessor, and said output multiplexer is controlled to connect said output of said microprocessor to said output pad and said means forces said additional logic to said predefined state.

2. An integrated circuit comprising:

a die having an input pad and an output pad;

a macrofunctional unit that is formed on the die and has an input and an output;

additional logic that is formed on the die and has a first output, a second output, a first input that is connected to the input pad and a second input that is connected to said output of the macrofunctional unit;

an input switch for selectively connecting the input pad or said first output of the additional logic to said input of the macrofunctional unit;

an output switch for selectively connecting said output of the macrofunctional unit or said second output of the additional logic to the output pad; and means for forcing the additional logic to a predefined state; in which said input multiplexer and said output multiplexer have control inputs that are responsive to a control signal having a normal state or a test state;

when said control signal has said normal state, said input multiplexer is controlled to connect said first output of said additional logic to said input of said microprocessor, and said output multiplexer is controlled to connect said second output of said additional logic to said output pad; and when said control signal has said test state, said input multiplexer is controlled to connect said input pad to said input of said microprocessor, said output multiplexer is controlled to connect said output of said microprocessor to said output pad and said means forces said additional logic to said predefined state.

3. An integrated circuit as defined in claim 2 wherein the macrofunctional unit comprises a microprocessor.

4. An integrated circuit as defined in claim 2 wherein the input switch includes an input multiplexer and the output switch includes an output multiplexer.

5. An integrated circuit as defined in claim 2 in which the macrofunctional unit comprises a microprocessor that is embedded in the additional logic.

* * * * *